United States Patent
Sotgiu et al.

(10) Patent No.: US 9,862,241 B2
(45) Date of Patent: Jan. 9, 2018

(54) DRIVE ASSEMBLY FOR TIRE SERVICE MACHINES

(71) Applicant: SNAP-ON EQUIPMENT SRL A UNICO SOCIO, Correggio (RE) (IT)

(72) Inventors: Paolo Sotgiu, Modena (IT); Lillo Gucciardino, Bomporto (IT)

(73) Assignee: SNAP-ON EQUIPMENT SRL A UNICO SOCIO, Corregio (RE) (IT)

( * ) Notice: Subject to any disclaimer, the term of this patent is extended or adjusted under 35 U.S.C. 154(b) by 204 days.

(21) Appl. No.: 14/416,057

(22) PCT Filed: Jul. 9, 2013

(86) PCT No.: PCT/EP2013/064474
§ 371 (c)(1),
(2) Date: Jan. 20, 2015

(87) PCT Pub. No.: WO2014/012820
PCT Pub. Date: Jan. 23, 2014

(65) Prior Publication Data
US 2015/0174974 A1 Jun. 25, 2015

(30) Foreign Application Priority Data
Jul. 20, 2012 (EP) .................................... 12177359

(51) Int. Cl.
*B60C 25/138* (2006.01)
*B60C 25/05* (2006.01)
*G01M 17/02* (2006.01)

(52) U.S. Cl.
CPC ........ *B60C 25/0545* (2013.01); *B60C 25/138* (2013.01); *G01M 17/021* (2013.01); *B60C 25/056* (2013.01)

(58) Field of Classification Search
CPC .. B60C 25/0545; B60C 25/138; B60C 25/056
See application file for complete search history.

(56) References Cited

U.S. PATENT DOCUMENTS

| | | | | |
|---|---|---|---|---|
| 2,220,404 A | * | 11/1940 | Hulslander | G01M 1/04 157/18 |
| 5,060,513 A | | 10/1991 | Rothamel | |
| 7,276,005 B2 | * | 10/2007 | Morikawa | B60K 17/046 180/65.6 |

FOREIGN PATENT DOCUMENTS

| | | |
|---|---|---|
| DE | 2241103 A1 | 2/1974 |
| DE | 3923191 A1 | 1/1991 |

(Continued)

OTHER PUBLICATIONS

International Search Report and Written Opinion issued in International Application No. PCT/EP2013/064474 dated Sep. 17, 2013.

(Continued)

*Primary Examiner* — Huan Le
(74) *Attorney, Agent, or Firm* — McDermott Will & Emery LLP (57) ABSTRACT

The invention provides a drive assembly for tire service machines comprising a drive motor having a rotatable output drive shaft, and a wheel support. The inventive drive assembly further comprises a gear unit having at least one gearbox, wherein the at least gear box has at least a gear box input shaft and a gear box output shaft. The wheel support is in 5 direct torque transmitting connection with the gear box output shaft, and the output drive shaft of the drive motor is in a direct torque transmitting connection with the gear box input shaft of the gear box. Furthermore, the drive assembly is adapted to provide structural support.

12 Claims, 6 Drawing Sheets

(56) References Cited

FOREIGN PATENT DOCUMENTS

| EP | 1367374 A2 | | 12/2003 |
|---|---|---|---|
| JP | 59-053211 A | | 3/1984 |
| JP | 59053211 A | * | 3/1984 |
| KR | 10-2006-0120782 A | | 11/2006 |

OTHER PUBLICATIONS

Chinese Office Action issued in Application No. 2013800489153 dated Apr. 1, 2016, with English translation.
Office Action issued in corresponding Chinese Patent Application No. 201380048915.3, dated Aug. 8, 2017 with English Translation.

* cited by examiner

DRIVE ASSEMBLY FOR TIRE SERVICE MACHINES

RELATED APPLICATIONS

This application is the U.S. National Phase under 35 U.S.C. §371 of International Application No. PCT/EP2013/064474, filed on Jul. 9, 2013, which in turn claims the benefit of European Application No. 12177359.2, filed on Jul. 20, 2012, the disclosures of which are incorporated by reference herein.

BACKGROUND OF THE INVENTION

The invention relates to an improved drive assembly for rotating and supporting a wheel to be serviced on a tire service machine. Furthermore, the invention relates to a tire changer for mounting and demounting a tire onto and from a rim, using an improved drive assembly. Additionally, the invention relates to a wheel balancer for balancing a wheel using an improved drive assembly.

A drive assembly for rotating and supporting a wheel in a tire mounting and demounting machine is known from EP patent application 1 724 125. A shaft being arranged vertically is directly coupled to an electro motor being arranged beneath the shaft. A rim to be serviced is placed on a wheel support driven by the shaft. When rotating, the shaft rotates a cone which clamps the rim of a wheel to be serviced against the wheel support. The whole driving force of the rotating movement for the drive assembly has to be applied by the motor which has to be powerful. Therefore, it is inevitable to have a big and powerful motor which is expensive and takes installation space. Furthermore, the arrangement of the known drive assembly provides another disadvantage. The mounting and demounting procedure that follows the clamping of a rim on the wheel support surface, is done by means of relatively high operation forces, which in general have to be accepted in a solid frame the drive assembly is accommodated.

A balancing machine for rotating bodies is known from EP patent application 1 367 374. A motor drives a shaft supporting a rotating body, in particular a wheel. The shaft is supported by tension members to measure the unbalance of the rotating body. The motor, which shall not produce noticeable vibrations in order to avoid a negative influence to the measuring results of the balancing machine, drives the rotating body. Therefore, normally the motor is chosen bigger than required to prevent the motor from producing noticeable vibrations. This provision of a motor being bigger than required also rises the costs for a balancing machine for rotating bodies.

Therefore, it is an object of the present invention to provide a drive assembly for tire service machines that requires a motor providing less torque and having smaller dimensions than that of tire service machines of the prior art.

SUMMARY OF THE INVENTION

In a first embodiment, the invention provides a drive assembly for tire service machines comprising a drive motor having a rotatable output drive shaft, and a wheel support. Furthermore, the inventive drive assembly comprises a gear unit. The gear unit has at least one gearbox, wherein the at least one gearbox has at least a gearbox input shaft and a gearbox output shaft. The wheel support is in direct torque transmitting connection with the gearbox output shaft, and the output drive shaft of the drive motor is in a direct torque transmitting connection with the gearbox input shaft of the gearbox. Furthermore, the drive assembly is adapted to provide structural support.

With this solution it is possible to use a drive motor that provides less torque and power, and has smaller dimensions than a drive motor for tire service machines of the prior art. The drive motor is chosen from a group of drives consisting of e.g. an electric motor, preferably an asynchronous motor, a fluid driven motor or any possible combination thereof. The output drive shaft of the drive motor can be provided with a polygon profile, a pinion gear geometry, a conical gear coupling or any other geometrical connection that enables a direct torque transmitting connection to the gearbox input shaft of the gearbox.

The direct torque transmitting connection of the output drive shaft of the drive motor and the gearbox input shaft can be provided by a rigid connection, for example a one piece shaft, or a detachable connection. The detachable connection can, for example, be provided by a flange connection between a gear unit input shaft flange and an output drive shaft flange of the drive motor, connected by bolts, screws or any other possible way of connecting both shafts. Furthermore, the detachable connection can also be provided by a clutch, for example a friction clutch, a fluid driven clutch or the like. Additionally, the detachable connection of both shafts can be provided by a detachable joint, e.g. an Oldham joint. If the direct torque transmitting connection can be easily detached, this enables an easy way to exchange the drive motor and/or the gearbox and/or the gear unit. The gear unit comprises at least one gearbox with or without further reduction or transmission stages, e.g. step-up gears, step-down gears as well as any other geometrical arrangement for transmission. Besides any possible further transmission means, connecting means or damping means may also be arranged between a gear unit input shaft and the at least one gearbox, between the at least one gearbox and a gear unit output shaft, or between two or more gearboxes. Furthermore, without transmission, connecting or damping means between the gear unit input shaft and the gearbox, the gearbox input shaft corresponds to the gear unit input shaft. Same is true for the gearbox output shaft. The gearbox output shaft corresponds to the gear unit output shaft in case no further transmission, connecting or damping means are arranged between the gearbox and the gear unit output shaft.

The drive assembly can be arranged in a vertical orientation along a common rotating axis, in a horizontal orientation or in any other orientation between the horizontal and vertical orientation depending on the configuration of a tire service machine, the inventive drive assembly shall be used with.

Generally, a wheel to be serviced is connected in a torque transmitting connection to the wheel support which can be constituted e.g. by a plate, chuck jaws, brackets, a centering cone for example being screwable in a hollow shaft, a self centering and anti-slipping system as well as any other means adapted to support a wheel rotationally fixed and centered to a rotatable shaft.

The gear unit is adapted to transmit low- and high rotational speed as well as low and high torque. The transmission may be done by means of the at least one gearbox, with or without further transmission means as already explained above.

As already mentioned above, a toothed gear of the gearbox being part of the gear unit can be directly connected to the output drive shaft of the drive motor. In such an arrangement, the output drive shaft of the drive motor extends inside the gear unit to connect the gearbox input shaft to the output drive shaft of the drive motor for establishing a direct torque transmitting connection between the gearbox input shaft and the output drive shaft of the drive motor.

Furthermore, with a direct torque transmitting connection between the output drive shaft of the drive motor and the gearbox input shaft, no pulleys, belts or the like are needed for transmitting the rotating motion provided by the output drive shaft of the drive motor. This leads to the fact, that the maintenance costs can be hold relatively low, and furthermore the drive assembly is easier to manufacture and service.

The drive assembly is adapted to provide structural support. In other words, the drive assembly is adapted to transmit and absorb forces which may be generated during a tire service process on the tire service machine and may be induced via tools of the tire service machine. The forces may also be induced by a movement, which can be a rotating movement of the tire to be serviced, during the tire service process. Also the wheel, the rim or the tire to be serviced on the tire service machine exerts a weight force onto the drive assembly, the wheel, the rim or the tire is placed onto. Furthermore, the drive assembly is adapted to transmit a flux of forces induced during the tire service machine in the tire service process, into a frame of the tire service machine, the floor the tire service machine is installed onto, or any other structural element being provided to absorb structural forces.

Thus, the drive assembly is also adapted to support not only the weight force of the wheel, but also the vibrations produced by the drive assembly, the rotational inertia force of the rotated wheel, and the forces which are exerted onto the wheel by a possible tool—for example a bead breaking tool.

The design of prior art machine frames of tire service machines had suffered from the burden to provide structural support. This burden of the prior art often resulted in large and bulky machine frames. With the use of a drive assembly being adapted to provide structural support, now no big effort has to be invested in providing specifically designed machine frames of the tire service machine. The design of tire service machines using a drive assembly according to the present invention can be built with a lean and light design.

In an aspect of the present invention, the drive assembly is adapted to transfer at least a part of a flux of forces generated during the tire service process on the tire service machine from the wheel support, via the gear unit having the at least one gearbox.

The gear unit or the gearbox or both, the gear unit and the gearbox, are adapted to cope with forces along their general axial direction, in particular along the gear unit input shaft and the gear unit output shaft or along the gearbox input shaft and the gearbox output shaft, respectively. Therefore, it is preferable—but not mandatory—that the gear unit input shaft and the gear unit output shaft are coaxial.

Naturally, the gear unit provides a gear unit casing being able to provide structural support. The gear unit casing is adapted to provide structural support in general in axial direction, in radial direction, as well as in every other orientation between the axial and the radial direction. Furthermore, also vibrations performed by the rotational movement of the wheel to be serviced on the drive assembly or additional vibrations resulting in unbalances on the wheel, the tire and/or the rim can be transferred by the gear unit. The gear unit casing is adapted to completely or partially cover, surround or even replace the casing of the gearbox.

When using a single stage planetary gearbox, also the planetary gearing stage itself is able to cope with axial forces by nature.

The axial direction of the gear unit generally corresponds to the axial direction of the drive assembly. Therewith, the axial direction of the gear unit corresponds to the direction of structural forces which are directed from the wheel support into the gear unit and/or the gearbox. In case a gear unit having a multi-stage gearbox with toothed gears is provided, also this gear unit or gearbox is at least partially able to provide structural support. Furthermore, also the gearing stage of a multi-stage gearbox itself is able to provide structural support, or at least to partially provide structural support. This can be done for example by means of herringbone gears.

The rotating wheel support and/or the gear unit output shaft—which can be integral with the gearbox output shaft—are rotationally decoupled from the gear unit casing and the drive motor casing, for example by a bearing. This bearing separates the rotating wheel support from the rotationally fixed gear unit housing and/or the gearbox housing.

An arrangement like the one explained above provides the advantage, that standard electric motors can be used, which provide a big cost-advantage. As already mentioned above, large and bulky machine frames are no longer needed in tire service machines when using the inventive drive assembly, because the inventive drive assembly is adapted to provide structural support itself. In particular by means of the gear unit being able to transfer the flux of forces, the drive assembly is performed even slimmer.

In a further aspect of the present invention, the drive assembly is adapted to transfer at least a part of the flux of forces via a drive unit comprising the drive motor.

This can mainly be done by the casing of the drive unit or the drive motor, respectively. The electric motor itself may further be able to transfer at least a part of the flux of forces. The flux of forces being transferred by the electric motor itself or the casing of the drive unit or the drive motor, respectively, can be guided to the frame of the tire service machine, or to the floor the tire service machine is placed onto. This leads to a possible omission of a structural cross beam which has been needed to close the flux of forces and to direct the flux of forces back to the frame, wherein the flux of forces may for example be induced from the tire service tool, penetrating a wheel to be serviced being placed on the wheel support as it is already explained above.

This leads again to an even more slim design of the inventive drive assembly. Additionally, the less parts and structural enforcement have to be embedded in the machine frame, the more cost-advantages can be reached. Thus, the inventive drive assembly provides cost advantages.

In another aspect of the present invention, the drive assembly provides a support unit, wherein the support unit is adapted to transfer at least a part of the flux of forces from the drive assembly to a frame of the tire service machine.

The drive assembly can be provided with a flange being part of the support unit and being reversibly or fixedly connected to—or even be in a one part configuration with—the inventive drive assembly. Furthermore, the support unit can be positioned or provided on the drive assembly at a vertical height between the gear unit and the electric motor. However, the support unit can also be provided lower or higher in vertical direction from the already explained position.

The support unit itself can be fixed by at least one fixing element onto a transverse beam or onto the frame of the tire service machine the inventive drive assembly is used with.

The fixation of the support unit can be done by means of fixing elements, which may for example be screws, bolts, brackets or any other possible means for fixing parts onto each other. Furthermore, also a welding connection between the frame of the tire service machine and the support unit being connected to the inventive drive assembly is possible.

Self-evidently, the support unit can be adapted to transfer the complete amount of flux of forces to the frame of the tire service machine. Furthermore, the support unit may be fixed to frame of the tire service machine, as already mentioned above, but also onto horizontal or vertical beams protruding from or belonging to a tire service machine.

In a variant of the present aspect, the inventive drive assembly can be supported by the support unit and placed with its most bottom part—represented by the drive unit—onto the floor or the basement the tire service machine is installed onto.

A drive assembly being provided with the support unit can be used in a big variety of tire service machines. Via the support unit, the drive assembly can easily be detached to a present tire service machine, or even to a tire service machine of the prior art.

In a further aspect of the present invention, a support element can be provided, wherein the support element is adapted to transfer at least a part of the flux of forces from the drive assembly to a floor the tire service machine is installed onto.

The gear unit can be provided by vertical beams or any other additional support representing the support element, wherein the support element is adapted to transfer at least parts of the flux of forces to the floor. Vertical or inclined beams representing the support element may be provided, which are supported on the floor or the basement the tire service machine is installed onto.

The support element can engage the drive assembly at any vertical position. The vertical position for the inventive drive assembly being engaged by the support element can be dependent from the above mentioned capability of gear unit and/or drive unit to transfer structural forces. In case a gear unit is provided which is able to provide structural support to the flux of forces, the support element can engage the drive assembly at a vertical position between the gear unit and the drive unit.

In a variant of the present aspect, the support unit and the support element can be provided to support the inventive drive unit. The amount of flux of forces can be transferred to the support unit—and therewith to the frame of the tire service machine—and the support element—and therewith to the floor or the basement the tire service machine is installed onto—in any possible ratio of distribution.

The use of the support element with the drive assembly enlarges the versatility of the drive assembly even more.

In an aspect of the present invention, the gearbox input shaft can be coaxial to the output drive shaft of the drive motor. The coaxiality of the output drive shaft of the drive motor and the gearbox input shaft provides the advantage that no rotary unbalances can be generated in this direct torque transmitting connection, because the gearbox input shaft rotates around the common axis of rotation with the output drive shaft of the drive motor. In a further advancement of the present aspect, the gear unit input shaft may be coaxial to the output drive shaft of the drive motor. This provides the advantage, that less rotary unbalances are generated in this torque transmitting connection because of the common rotary axis.

In another advancement of the present aspect, the drive motor being part of a drive unit may be placed in any relationship to the gear unit. The drive motor may for example be arranged in an angular relationship to the gearbox and/or the gear unit, respectively. This angular relationship between the drive motor and the gearbox and/or the gear unit can be from 0 to 180 degrees, preferably 90 degrees, wherein for example a conical gear coupling between the drive motor and the gearbox and/or the gear unit, respectively, may be provided.

Furthermore, also an axial offset between the drive motor and the gearbox and/or the gear unit may be provided. The arrangement of the drive motor and the gearbox and/or the gear unit having an axial offset may be provided with a drive motor axis and a gearbox and/or gear unit axis being parallel, however, this is not mandatory. The arrangement of the drive motor and the gearbox and/or the gear unit not being coaxial can be advantageous in terms of limited installation space.

In a further aspect of the present invention, the gearbox output shaft can be coaxial to the output drive shaft of the drive motor. With the coaxiality of the gear box output shaft and the output drive shaft of the drive motor, the wheel support rotates around the common axis of the output drive shaft of the drive motor and the gear unit output shaft. In a further advancement of the present aspect, the gear unit output shaft may be coaxial to the output drive shaft of the drive motor, too. This provides the advantage, that less rotary unbalances are generated in this torque transmitting connection because of the common rotary axis. Therewith, also the wheel which can be placed on the wheel support, rotates around the common axis of the output drive shaft of the drive motor and the gearbox output shaft or even around the common axis of the output drive shaft of the drive motor and the gear unit output shaft. This leads to small rotary unbalance forces acting on the drive assembly. Furthermore, because of the coaxiality of the gearbox output shaft and/or the gear unit output shaft and the output drive shaft of the drive motor, no offset between said shaft axes is present. Therewith, the installation space for the inventive drive assembly is minimized.

The connection of the output drive shaft of the drive motor and the gearbox input shaft can be provided by a rigid connection, for example a one piece shaft, or a detachable connection. The detachable connection can, for example, be provided by a flange connection between a gearbox input shaft flange and the output drive shaft flange of the drive motor, connected by bolts, by means of screws or any other possible way of connecting both shafts. Furthermore, the detachable connection can also be provided by a clutch, for example a friction clutch, a fluid driven clutch or the like. Additionally, the detachable connection of shafts can be provided by a detachable joint, e.g. an Oldham joint.

Moreover, the drive motor can be an electric motor which is speed controlled by an inverter. With the deployment of an inverter that controls the speed of the electric motor, a movement in a direction against a main rotating direction of the electric motor can be prevented. The voltage supply of the electric motor is done by the inverter, which uses pulse width modulation. Furthermore, by means of an inverter, the electric motor can be controlled in a wide velocity range.

The current supplying the electric motor can be changed by the inverter with a high frequency such that by means of the inertia of the rotor, a holding torque keeps the rotor fixedly in position. Together with the rotor of the electric motor, also the gear unit, providing the gear unit output shaft, and the wheel support are held in position.

In a first variant of the present invention, the at least one gearbox, which is a part of the gear unit, can be a multi-stage device. In particular, the gearbox can have at least two stages, and at least two gearing shafts. The gearbox input shaft may coincide with the gearbox output shaft, wherein at least one of the gearing shafts may be a hollow shaft. Alternatively, the gearbox input shaft may be coaxial with the gearbox output shaft, or may be offset from the gearbox output shaft, which is the common way of use for multi-stage devices. In a further alternative, the gearbox input shaft and the gearbox output shaft may coincide with the gearing shafts of the at least two gearing stages of the multi-stage device.

In a second variant of the present invention, the at least one gearbox being part of the gear unit, can be a single stage device, preferably a planetary gear. In principle, a single stage gearbox can also be formed by a pair of toothed gears, which is a simple and non-cost-effective way to transmit torque and rotating speed. However, the single stage gearbox in form of a pair of toothed gears shows the disadvantage of the gearbox input shaft and the gearbox output shaft having an offset from each other. This leads to vibrations and may lead to rotating forces which have to be absorbed by a casing of the gearbox and the gear unit, respectively.

While the transmission range of a pair of toothed gears is highly limited, a transmission by a planetary gear, which is a single stage transmission, too, offers a high range of possible transmission ratios, in particular a reduction from at least 1:150, more preferably 1:170 or even 1:200. This high transmission ratio is possible because of the fact that more toothed gears are in engagement permanently.

The use of a planetary gear offers the advantage, that little vibrations are produced. Furthermore, the use of a planetary gear provides the advantage, that the gearbox input shaft may be coaxial to the gearbox output shaft, which leads to little vibrations produced by the planetary gear. The dimension of the planetary gear is smaller than the one of a common single stage transmission with a pair of toothed gears or a multi stage transmission with or without an offset between the gearbox input shaft and the gearbox output shaft. In particular, the diameter as well as the height of the planetary gear are smaller than the dimensions of the wheel to be serviced placed onto the wheel support. This improves the operability of the drive assembly for the working person placing a wheel onto the wheel support.

Preferably at least one of the three gearbox shafts of the planetary gear can be provided as hollow shaft.

In a further aspect of the present invention, the gear unit output shaft and the wheel support can be made from one piece. With the one piece configuration for the gear unit output shaft and/or the gearbox output shaft with the wheel support, no additional parts have to be rotated by the drive motor. The wheel support and the gear unit output shaft can rotate along a common axis of rotation. Thereby, no additional unbalance forces or rotational forces and torques have to be absorbed by the drive assembly.

In an additional aspect, the gear unit can be directly flanged onto the drive motor. This can be realized by a connection of bolts, countered screws or any other possible way of connection. Preferably, this connection of gear unit and drive motor is detachable in order to be easily detached in case of service workings or the like. The installation space the drive assembly takes can be reduced.

It is further possible that the gear unit can be flanged on the side of the motor providing the output drive shaft of the drive motor.

In another embodiment of the present invention, a tire changer for mounting and demounting a tire onto or from a rim comprises a machine frame, at least one tool for performing a mounting and/or demounting operation, and a drive assembly according to claims 1 to 12.

In a first variant, the tire changer can be of the "Swing" type, which means a cylinder providing at least a debeading tool is provided externally to the machine frame of the tire changer.

In a second variant, the tire changer can be of the "Tilting tower" type, which means a cylinder providing at least a debeading tool and another cylinder tilting the tower are provided externally to the machine frame of the tire changer.

In another variant, the tire changer can be of any possible geometrical arrangement affording a wheel support rotated by a drive motor.

Furthermore, the drive assembly can be placed externally with respect to the machine frame of the tire changer.

Actuating pedals, displaced on a pedals pad, can be placed external to the tire changer machine frame, too. With an arrangement like that, the drive assembly which is not directly integrated in the machine frame of the tire changer, is easily accessible for a person performing any service task.

The drive assembly can be attached such that it is hanging on the tire changer machine frame. This can be realized by means of a support unit via which the drive assembly is fixed onto the frame of a tire service machine, in particular a tire changer or a wheel balancer. Furthermore, the drive assembly may be fixed via its support unit on a vertical beam starting from and/or connected to the frame of the tire service machine. Therewith, the drive assembly does not touch the floor, in particular the basement onto which the tire changer is installed.

In a variant of the present embodiment, the drive assembly can be placed externally with respect to the machine frame of the tire changer. Furthermore, the drive assembly can touch the floor, in particular the basement onto which the tire changer is installed.

In another preferred embodiment, a wheel balancer for balancing a wheel or a rim of a wheel comprises a machine frame, at least one measuring unit for measuring a possible unbalance of the wheel or rim, and a drive assembly according to claims 1 to 9.

In view of all inventions described therein, the gear unit together with the at least one gearbox can be equipped with a shiftable geometry together with at least one shifting actuator. Therefore, the gear unit may provide a shift collar, together with a shifting fork or the like which enables the gear unit to shift gears. Therewith, it is further possible to reverse the rotating movement to turn the wheel support in a reverse direction by means of a reverse gear. This may be preferable in case of failure or emergency to prevent a working person from being injured.

Furthermore, an arrangement like this enables the drive assembly to consider deeply the different demands on rotating force and actuating force exerted by any tools penetrating the wheels. Especially in case wheels with heavy weight and reinforced sidewalls, for example self supporting runflat tires, are to be serviced in tire service machines, a shiftable gear unit is highly appreciated because proper servicing of this wheels requires high torque and force applied by the drive motor. The relationship between rotating speed and applicable torque onto the wheel can then be controlled.

Other advantages and two embodiments of the present invention shall now be described with reference to the attached drawings. The terms "top", "bottom", "up", "low", "left" and "right" used when describing the embodiment, relate to the drawings orientated in such a way that the reference numerals and name of the figures can be read normally.

DETAILED DESCRIPTION OF THE INVENTION

Figure 1:
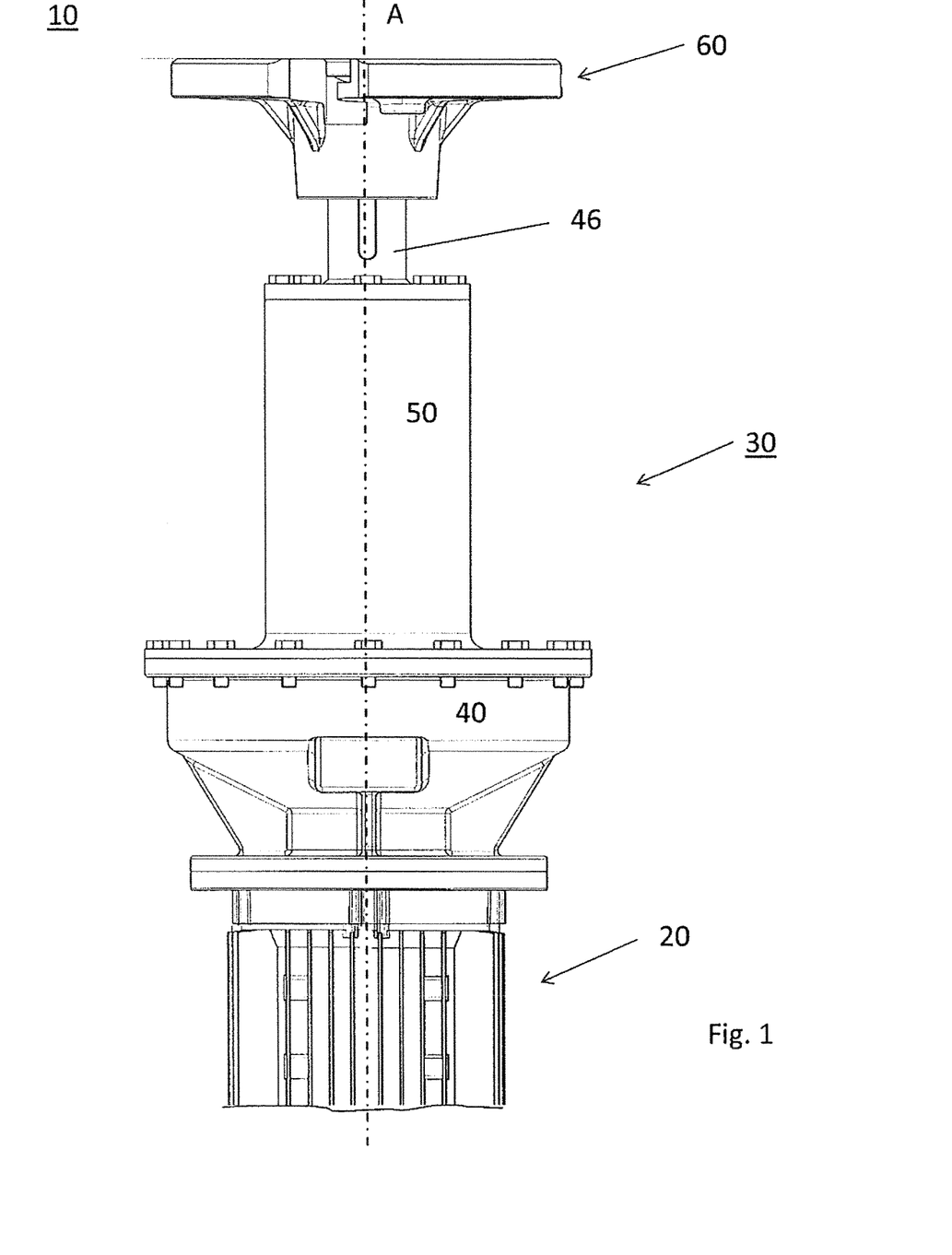
FIG. 1 shows a front view of the inventive drive assembly according to a first embodiment of the present invention.

In a first embodiment shown in FIG. 1, an inventive drive assembly 10 represents a component of a tire service machine (not shown). The drive assembly 10 of FIG. 1 comprises as main components a drive unit 20, a gear unit 30 having a gearbox 40, a guide unit 50 and a wheel support unit 60, wherein the components of drive assembly 10 are arranged along a common axis of rotation A in vertical orientation. The orientation of all components of drive assembly 10 along the common axis of rotation A is only by way of a non-limiting example. The components of drive assembly 10 may also be placed in a non-coaxial or an angular arrangement. Gear unit 30 is directly flanged onto drive unit 20, both are arranged along common axis of rotation A. Wheel support unit 60, which is arranged adjacent to gear unit 30 in a direction opposite to drive unit 20, is adapted to support a wheel to be serviced (not shown) onto a tire service machine inventive drive assembly 10 is used with.

Figure 2:
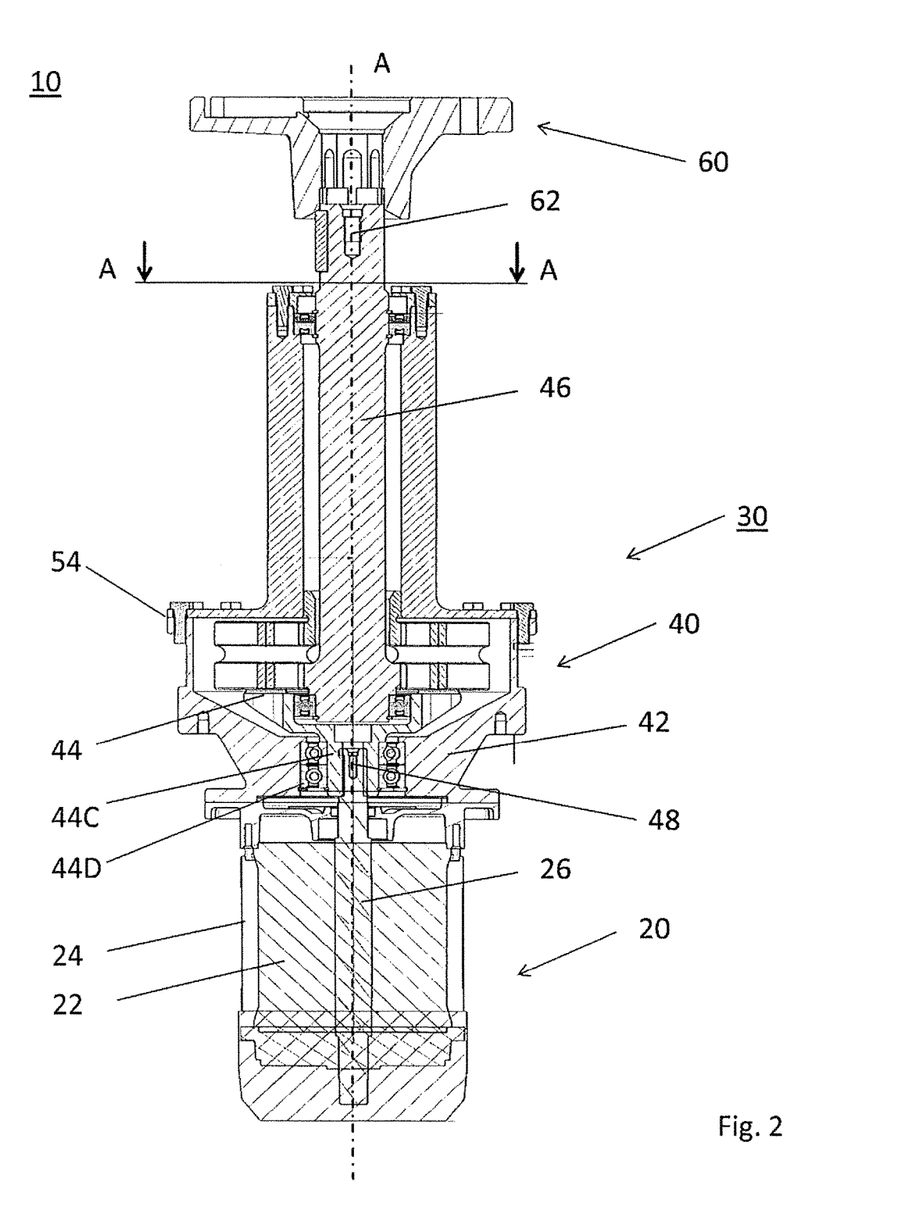
FIG. 2 shows a cross sectional view of the inventive drive assembly of FIG. 1.

Drive unit 20 comprises a drive motor 22 as shown in FIG. 2, having a drive motor casing 24 and a rotatable output drive shaft 26. In the present embodiment, drive motor 22 with its output drive shaft 26, together with gear unit 30 and wheel support unit 60 are arranged in a vertical direction as already mentioned above, however every orientation between the vertical and the horizontal orientation is possible.

Drive motor 22 is an electric motor, which is controlled by an inverter (not shown). Output drive shaft 26 of drive motor 22 is in direct torque transmitting connection to a gear unit input shaft (in the present embodiment: planet carrier shaft 44C) of gear unit 30, as explained in the following. Gear unit 30 is arranged directly above drive unit 20 in vertical direction, along common axis of rotation A.

Figure 3:
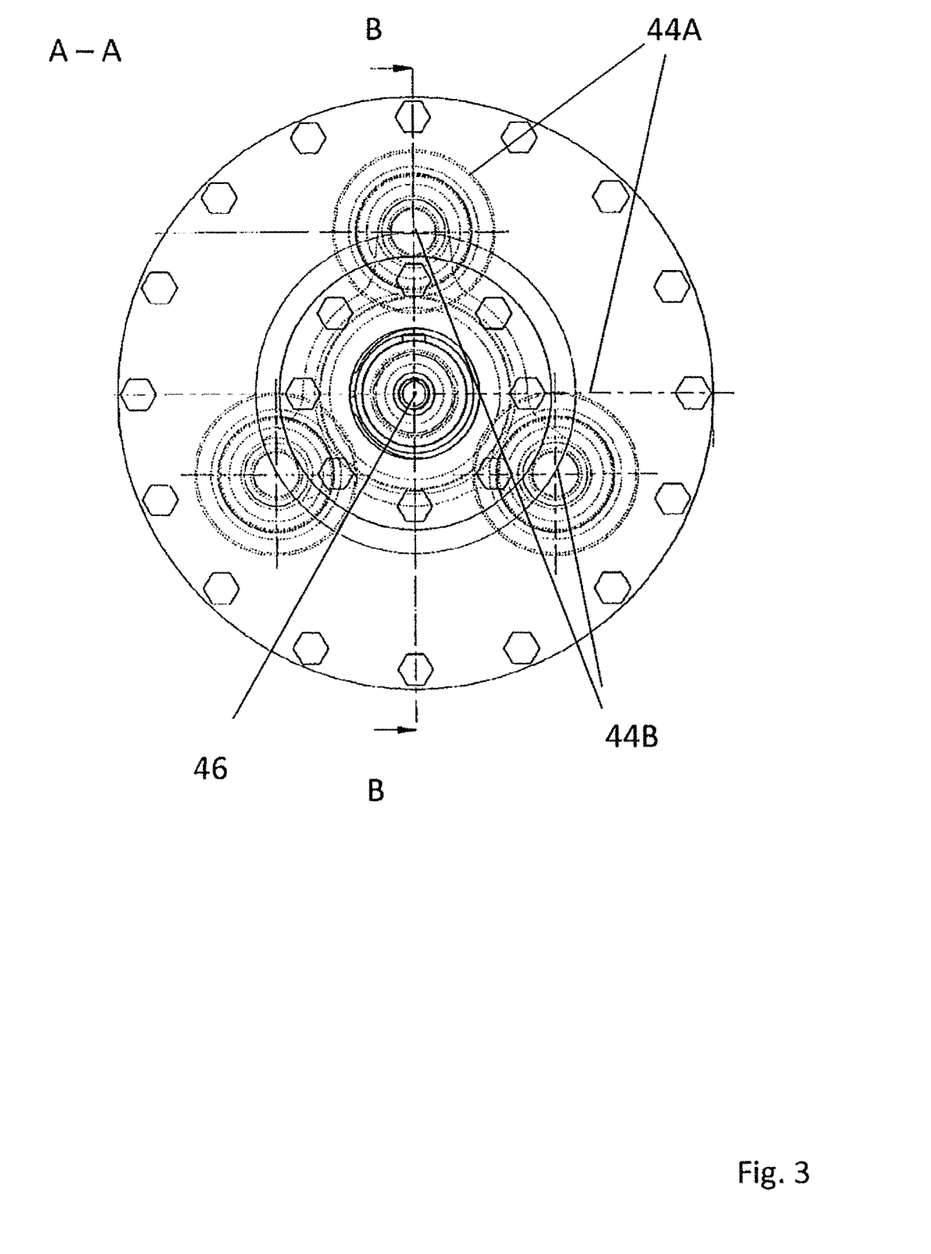
FIG. 3 shows a cross sectional view along the line A-A of FIG. 2.
Figure 4:
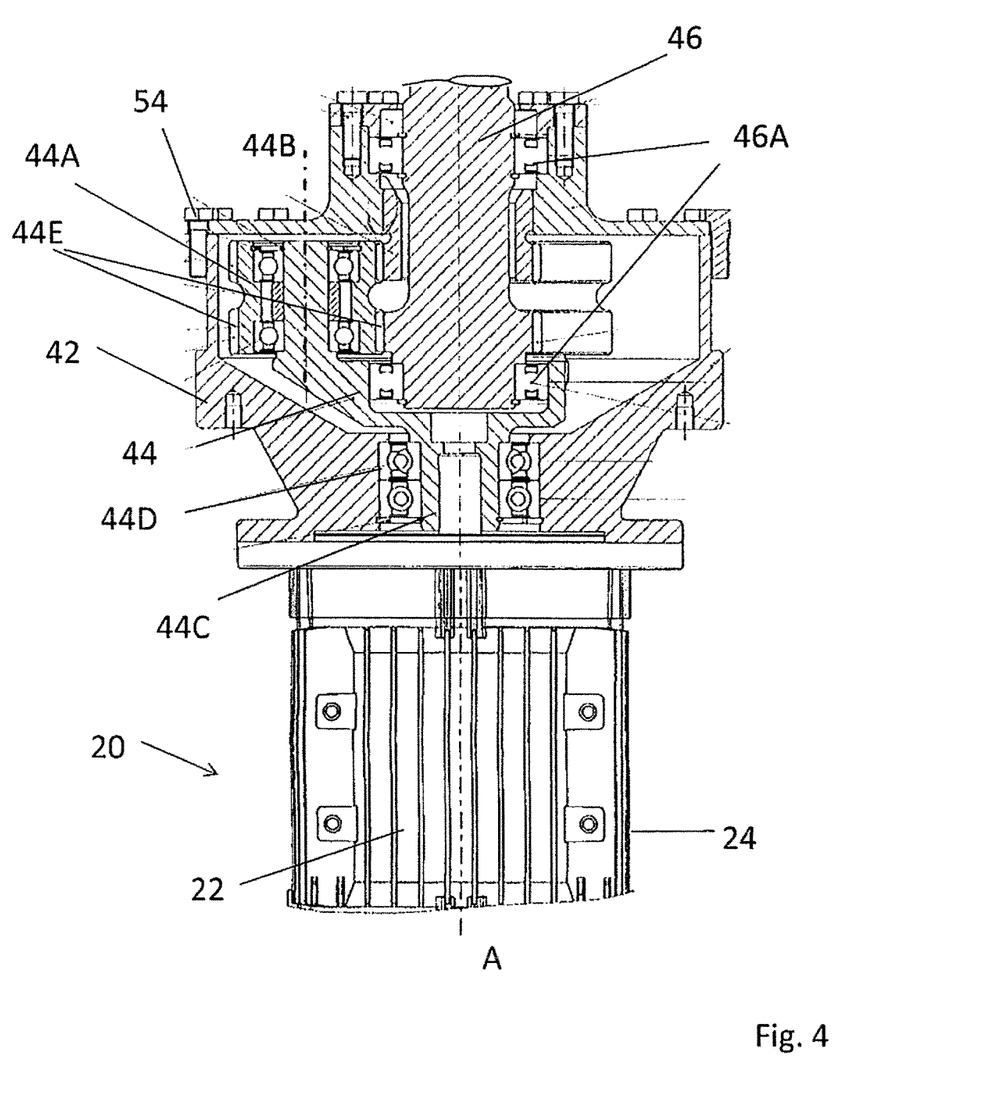
FIG. 4 shows a more detailed cross-sectional cut-away view along the line B-B of FIG. 3.

Gear unit 30 comprises gearbox 40 and guide unit 50, wherein gearbox 40 is adjacent to drive motor 22. Gearbox 40 is a single stage device, in particular a planetary gearbox as shown in FIGS. 2, 3 and 4, comprising three gearing elements, namely an annulus 42, a planet carrier 44 carrying three planet gears 44A each being rotatable around rotating axes 44B, and a sun gear 46 representing gear unit output shaft. Annulus 42, an outer ring with inwardly facing teeth (not shown), is rotationally fixed and rigidly connected to drive motor casing 24. Furthermore, annulus 42 represents a gearbox housing, and therewith a part of a gear unit housing. The outwardly facing teeth 44E of planet gears 44A mesh with inwardly facing teeth of annulus 42.

Rotating axes 44B of three planet gears 44A, all of same size, are joined in planet carrier 44. Planet carrier 44 combines rotating axes 44B of planet gears 44A to a single planet carrier shaft 44C. Planet carrier shaft 44C is axially held by a bearing 44D of planet carrier 44. Furthermore, planet carrier shaft 44C represents the gear unit input shaft. Output drive shaft 26 of drive motor 22 is fixedly connected by a connecting bolt 48 to gear unit input shaft being represented by planet carrier shaft 44C. Because of the direct torque transmitting connection between gear unit input shaft and output drive shaft 26 of drive motor 22, gear unit input shaft directly follows a rotating movement of output drive shaft 26 of drive motor 22.

In the present embodiment, gear unit output shaft is represented by the third gearing element, sun gear 46. Sun gear 46 is coaxial to planet carrier 44 as well as output drive shaft 26 of drive motor 22. Therewith, sun gear 46 is coaxial to output drive shaft 26 along common axis of rotation A.

Guide unit 50 (see FIG. 2) which is a component of gear unit 30, comprises an elongated casing 52 for gear unit output shaft 46. Furthermore, elongated casing 52 is fixedly connected by means of screws 54 to gearbox housing represented by annulus 42. Elongated casing 52 which rotatably supports gear unit output shaft 46 via a bearing 56, is elongated along common axis of rotation A of output drive shaft 26 of drive motor 22, gear unit input shaft 44 and gear unit output shaft 46. Generally, guide unit 50 is solely used for elongating the drive assembly 10 along the common axis of rotation A. Therewith, a comfortable working position of wheel support unit 60 for a working person to lift a wheel to be serviced onto can be provided, also in case the drive assembly 10 is put on the floor or on the basement the tire service machine is provided onto.

Gear unit output shaft 46 protrudes from elongated casing 52 along common axis of rotation A. Wheel support unit 60 is in torque transmitting connection with gear unit output shaft 46 by means of a connecting element 62 which is represented by a bolt, located pivotally on wheel support unit 60 and screwed into sun gear 46 along common axis of rotation A. Connecting element 62 ensures a fixed connection such that wheel support unit 60 is forced to directly follow a rotating movement of gear unit output shaft 46 guided in elongated casing 52.

Figure 5:
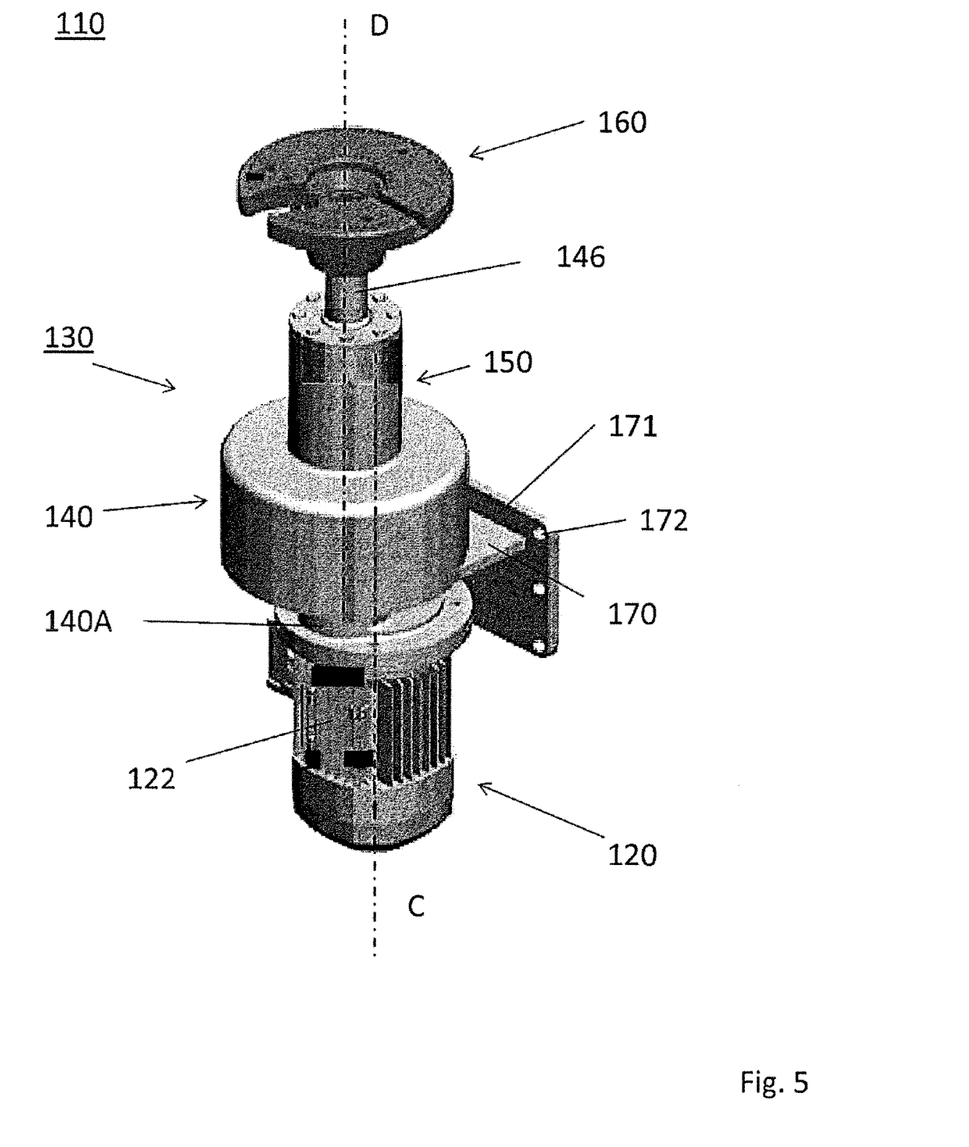
FIG. 5 shows a perspective view of the inventive drive assembly according to a second embodiment of the present invention.

In a second embodiment of the present invention, a drive assembly 110 as shown in FIG. 5, comprises as main components a drive unit 120, a gear unit 130 and a wheel support 160 as it is already shown for the first embodiment. Similar to the first embodiment, also for the second embodiment, wheel support 160 is adjacently vertically arranged above gear unit 130, that itself is adjacently vertically arranged above drive unit 120. Furthermore, a gear unit output shaft 146 connects wheel support 160 and gear unit 130. Gear unit 130 comprises a guide unit 150 as well as a gearbox 140, wherein guide unit 150 supports output shaft 146 of gearbox 140. Gearbox 140 of the second embodiment is a planetary gearbox similar to the one already explained for the first embodiment shown in FIGS. 1 to 4. Gearbox 140 is connected to drive unit 120 via a step down gear 140A being provided between drive unit 120 and gear unit 130. Via step down gear 140A, an output drive shaft of drive motor 122 being part of drive unit 120 is in a direct torque transmitting connection to the gearbox input shaft of gearbox 140. Step down gear 140A leads to an axial offset between a rotary axis C of drive unit 120 and a wheel rotation axis D. However, the provision of step down gear 140A is only by way of a non-limiting example. The drive assembly according to the second embodiment can be provided without a step down gear between the drive unit and the gearbox, as it is not shown in FIG. 5. Furthermore, also another step down gear (not shown in FIG. 5) replacing step down gear 140A can be provided, that does not lead to an axial offset between the rotary axis of the drive unit and the wheel rotation axis such that the rotary axis of the drive unit is coaxial with the wheel rotation axis.

Wheel rotation axis D is the common rotational axis of single stage planetary gearbox 140, gear unit output shaft 146 and wheel support 160. Thus, the gearbox input shaft is not coaxial to the output drive shaft of drive motor 122.

A support unit 170 is provided, via which drive assembly 120 can be fixed onto a tire service machine. Support unit 170 as can be seen in FIG. 5, can be provided at a vertical position or height of drive assembly 110 between gear unit 130 and drive unit 120. However, support unit 170 can also be placed on drive assembly 110 at the same vertical height of the gear unit, or even lower in vertical direction, for example at the same vertical height of drive unit 120 or at any position in between the aforementioned positions. The fixation my be performed by fixing means, which can e.g. be screws or bolts. For this fixation, support unit 170 is provided with a flange 171 being arranged vertically. Furthermore, flange 171 provides at least one fixation hole 172 through which fixing means may be guided to fix drive assembly 110 via support unit 170 having flange 171 and fixation holes 172 onto extensions of the frame of the tire service machine, onto horizontal or vertical beams protruding from or belonging to a tire service machine, or onto a beam protruding from the floor, a tire service machine is installed onto.

By means of an additional transmission stage constituted by step down gear 140A as shown in FIG. 5, the function of transmission performed by gearbox 140 is further supported. By having step down gear 140A, even higher torque can be provided by drive assembly 110 driving wheel support 160 onto which a wheel to be serviced is placed. This higher torque can be useful in case heavy weight wheels, run flat wheels or self inflating wheel have to be serviced.

With an arrangement of support unit 170 being provided between gear unit 130 and drive unit 120 as shown in FIG. 5, gear unit 130 is incorporated in the flow of forces the drive assembly transmits. A tool (not shown) penetrating a wheel to be serviced being placed onto wheel support 160 exerts penetrating force onto a wheel, and therewith onto wheel support 160. This force has to be transferred by components being able to transmit structural force, whereby the force exerted by the tool penetrating a wheel is exerted in the direction of wheel rotation axis D. The force directed in direction D is transmitted via wheel support 160 and gear unit output shaft 146 into and through gear unit 130. In gear unit 130, not only the housing of gear unit 130 is able to transmit structural forces, but also the transmission stage of gearbox 140 being in form of a planetary gear, transmits structural forces around its axial direction, being wheel rotation axis D. Furthermore, also step down gear 140A is adapted to transmit structural forces, wherein, additionally, the transmission of the rotation around wheel rotation axis D of wheel support 160 and gearbox 140 is shifted to rotation around rotary axis C of drive unit 120. The flux of forces is turned away from following rotary axes C and D to follow the horizontal extension of support unit 170. Furthermore, by means of support unit 170, the flux of forces is directed away from drive assembly 10 into the component support unit 170 is fixed onto via its flange 171 having fixation holes 172 and fixation means, as it is already explained above.

The number of components of drive assembly 110 participating in transmitting the flux of forces, indicated by the tool penetrating a wheel placed onto wheel support 160, depends from the vertical position in which support unit 170 is provided onto drive assembly 110. In a third embodiment shown in FIG. 6, a drive assembly 210 represents a component of a tire service machine (not shown), too. Drive assembly 210 as shown in FIG. 6 comprises as main components a drive unit 220 and a wheel support unit 260 similar to the first and second embodiment shown in FIGS. 1 to 5.

Furthermore, a multi stage gear unit 230 having a multi-stage gearbox 240, in particular a three-stage gearbox, is provided. Multi-stage gear unit 230 is directly flanged onto drive unit 220, and comprises a multi-stage gear unit input shaft (not shown) being coaxial to output drive shaft (not shown) of drive motor 222 along a rotary axis E. Besides a multi-stage gear unit input shaft, multi-stage gear unit comprises further a first gear shaft, a second gear shaft (both are not shown, too) and a multi-stage gear unit output shaft 246. Multi-stage gear unit output shaft 246 is coaxial to wheel support 260 along a wheel rotation axis F. Therewith, the drive torque applied by drive motor 222 on multi-stage gear unit input shaft is transmitted by three gear stages—from the multi-stage gear unit input shaft onto the first gear shaft, from the first gear shaft onto the second gear shaft, and finally from the second gear shaft onto the multi-stage gear unit output shaft.

Furthermore, wheel support unit 260, which is arranged adjacent to multi-stage gear unit 230 in a direction opposite to the drive unit 220, is adapted to support a wheel to be serviced onto a tire service machine the inventive drive assembly 210 according to the third embodiment is used with.

Figure 6:
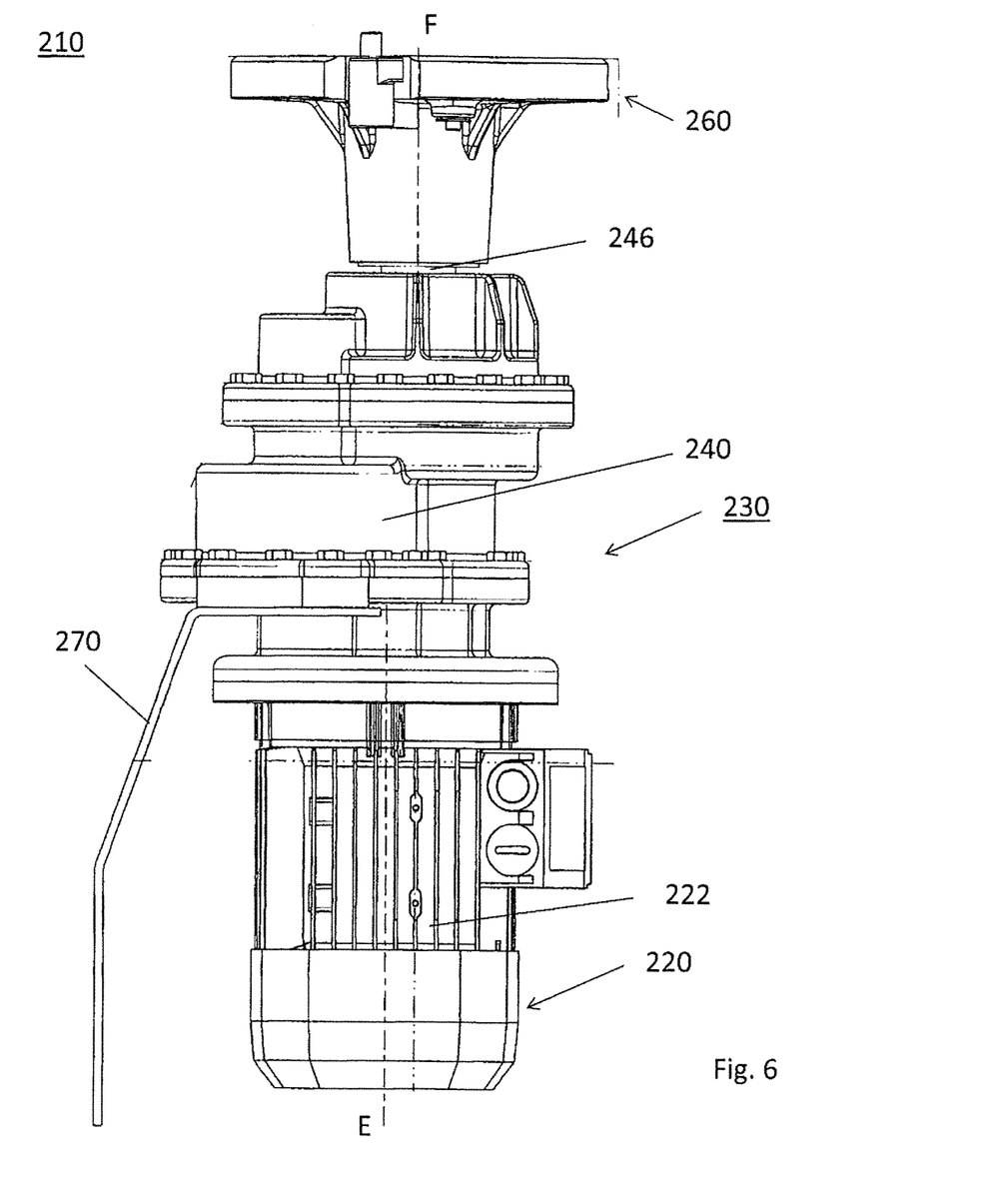
FIG. 6 shows a front view of the inventive drive assembly according to a third embodiment of the present invention.

In the third embodiment as can be seen in FIG. 6, rotary axis E of drive unit 220 is offset from wheel rotation axis F, however, this is only a special feature of the multi-stage gearbox, used in the present embodiment. Multi-stage gearboxes naturally can have a multi-stage gear unit output shaft being coaxial to a multi-stage gear unit input shaft.

In the third embodiment as shown in FIG. 6, multi-stage gear unit input shaft, which is coaxial to output drive shaft of drive motor 222, is offset from multi-stage gear unit output shaft 246. Therewith, wheel rotation axis F of wheel support unit 260, does not coincide with rotary axis E of the output drive shaft of drive motor 222 or the multi-stage gear unit input shaft, respectively.

Drive assembly 210 is provided with a support unit 270 via which drive assembly 210 can be fixed onto a frame of a tire service machine or onto a horizontal or vertical beam protruding from or belonging to a tire service machine. This fixation of drive assembly 210 by means of support unit 270 can be performed by screws, bolts, clamps or the like, as it is already explained together with FIG. 5 above. As already explained for FIG. 5 above, too, support unit 270 is provided between drive unit 220, which is the very low end of drive unit in vertical direction, and gear unit 230 provided between drive unit 220 at the low end and wheel support at the high end of drive assembly along the vertical direction. Also, multi-stage gear unit 230 having multi-stage gearbox 240 is adapted to provide structural support to forces induced by a tool penetrating a wheel to be serviced placed onto wheel support 260. The flux of forces is transmitted by support unit 270 into the frame of a tire service machine or the protrusion from said frame, support unit 270 is fixed onto. As already mentioned above according to FIG. 5, the number of components of drive assembly 210 that participate in transmitting the flux of forces, indicated by the tool penetrating a wheel placed onto wheel support 160, depends from the vertical position in which support unit 270 is provided onto drive assembly 210.

The drive assembly 10, 110, 210 of the present invention can be deployed with tire service machines, preferably with tire changers or wheel balancers.

REFERENCE LIST 10, 110, 210 drive assembly
A common axis of rotation
C rotary axis
D wheel rotation axis
20, 120, 220 drive unit
22, 122, 222 drive motor
24 drive motor casing
26 output drive shaft
30, 130 gear unit
40, 140 planetary gearbox
42 annulus (gearbox housing)
44 planet carrier
44A planet gear
44B rotating axes of planet gears
44C planet carrier shaft (gear unit input shaft)
44D bearing of planet carrier
44E teeth
46, 146 gear unit output shaft (sun gear)
46A bearing of gear unit output shaft (sun gear)
48 connecting bolt
50 guide unit
52 elongated casing
54 screws
56 bearing
60, 160, 260 wheel support
62 connecting element
140A step down gear
170, 270 support unit
171 flange
172 fixation holes
230 multi-stage gear unit
240 multi-stage gearbox
246 multi-stage gear unit output shaft
E rotary axis
F wheel rotation axis

The invention claimed is:

1. A drive assembly for a tire service machine, comprising:
   a drive unit, comprising a drive unit casing and a drive motor having a rotatable output drive shaft;
   a wheel support; and
   a gear unit having at least one gearbox,
   wherein the at least one gearbox has at least a gearbox housing, a gearbox input shaft, and a gearbox output shaft,
   wherein the wheel support is in direct torque transmitting connection with the gearbox output shaft,
   wherein the output drive shaft of the drive motor is in a direct torque transmitting connection to the gearbox input shaft of the gearbox,
   wherein the drive assembly is adapted to transfer at least a part of a flux of forces generated during the tire service process on the tire service machine from the wheel support, via the gearbox housing; and
   wherein a support unit is provided between the gear unit and the drive unit and is adapted to transfer at least a part of the flux of forces from the wheel support via the gearbox housing to a frame of the tire service machine or a floor the tire service machine is installed onto.

2. The drive assembly as claimed in claim 1, wherein the support unit is adapted to transfer the at least a part of the flux of forces to the frame of the tire service machine.

3. The drive assembly as claimed in claim 1, wherein the support element is adapted to transfer the at least a part of the flux of forces to the floor the tire service machine is installed onto.

4. The drive assembly as claimed in claim 1, wherein the gearbox input shaft is coaxial to the output drive shaft of the drive motor.

5. The drive assembly as claimed in claim 1, wherein the gearbox output shaft is coaxial to the output drive shaft of the drive motor.

6. The drive assembly as claimed in claim 1, wherein the drive motor is an electric motor, and wherein the electric motor is speed controlled by an inverter.

7. The drive assembly as claimed in claim 1, wherein the gearbox is a multi-stage device.

8. The drive assembly as claimed in claim 1, wherein the gearbox is a single-stage device, preferably a planetary gear mechanism.

9. The drive assembly as claimed in claim 1, wherein the gearbox output shaft and the wheel support are made from one piece.

10. The drive assembly as claimed in claim 1, wherein the gear unit is directly flanged onto the drive motor.

11. A tire changer for mounting and demounting a tire onto/from a rim, comprising the drive assembly as claimed in claim 1.

12. A wheel balancer for balancing a wheel or a rim of a wheel, comprising the drive assembly as claimed in claim 1.

* * * * *